United States Patent [19]

Peralta

[11] 4,224,512
[45] Sep. 23, 1980

[54] HIGHLY SENSITIVE NON-REFRIGERATED RADIATION SENSOR

[75] Inventor: Eduardo J. Peralta, Santa Ana, Calif.

[73] Assignee: Ford Aerospace & Communications Corp., Dearborn, Mich.

[21] Appl. No.: 3,691

[22] Filed: Jan. 15, 1979

[51] Int. Cl.³ .............................................. H01J 40/14
[52] U.S. Cl. ..................................................... 250/215
[58] Field of Search ................................. 250/215, 338

[56] References Cited
PUBLICATIONS

Bulman et al., "IRE Transactions on Antennas and Propagation", Mar. 1961.

Primary Examiner—David C. Nelms
Assistant Examiner—Darwin R. Hostetter
Attorney, Agent, or Firm—Paul K. Godwin, Jr.; Clifford L. Sadler

[57] ABSTRACT

A highly sensitive non-refrigerated sensor configured in a microwave bridge to receive incident radiation from a remote target or source. A test arm of the microwave bridge has an aperture for receiving the incident radiation and for allowing that radiation to enter the test arm. A photoconductive film is mounted within the test arm to receive a defocused image of the target. The effect of the incident radiation illuminating the photoconductive film is to change its conductivity characteristics and simultaneously change the reflectance/transmittance characteristics within the test arm of the microwave bridge. An RF detector senses the imbalance of the bridge and produces an output which is used to either indicate the strength of the received incident radiation or to feedback information to a reference arm of the bridge. The feedback information is used to adjust the phase and amplitude of the microwave energy in the reference arm and rebalance the bridge.

8 Claims, 1 Drawing Figure

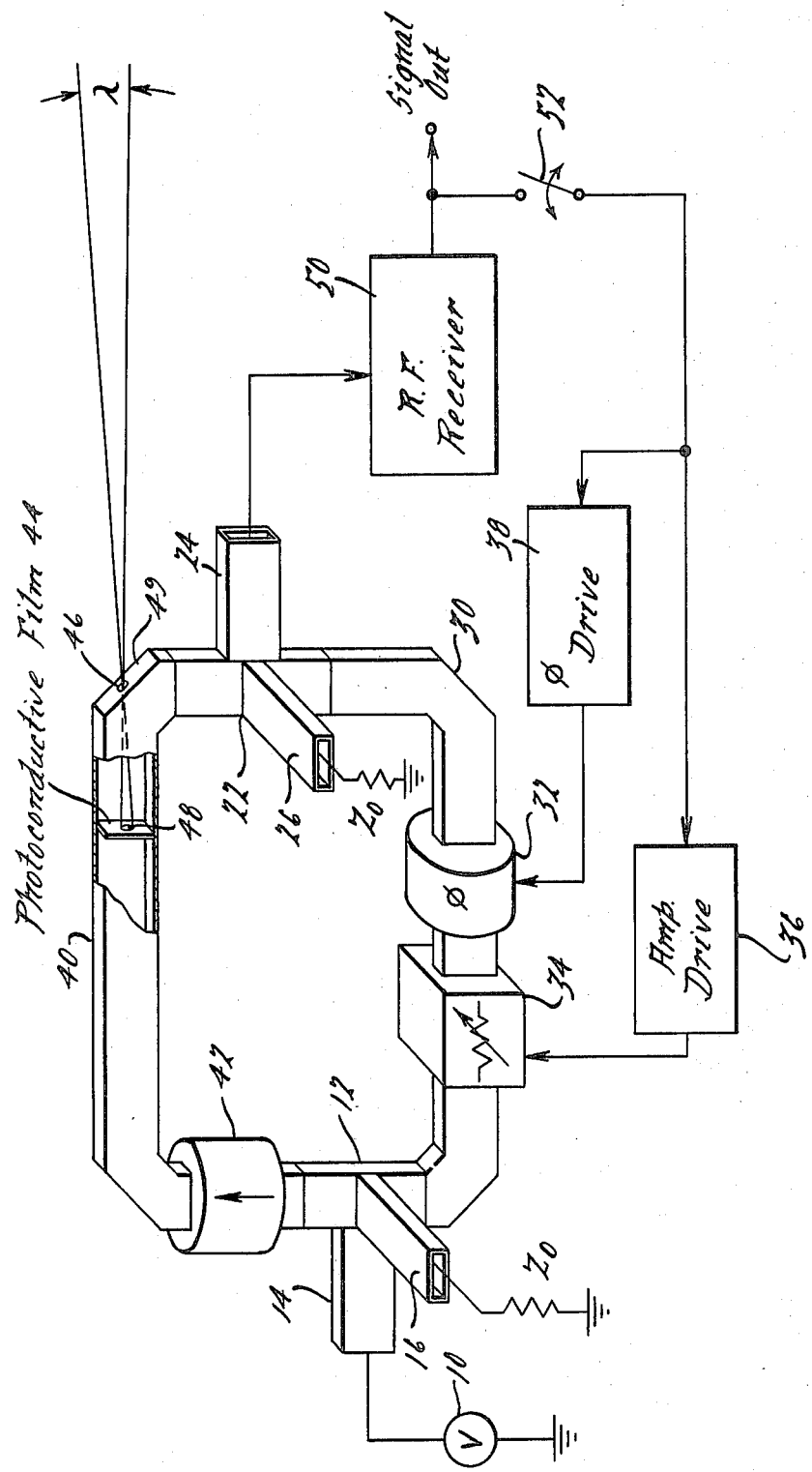

HIGHLY SENSITIVE NON-REFRIGERATED RADIATION SENSOR

BACKGROUND OF THE INVENTION

1. Field of the Invention

The present invention is related to radiation sensors and more specifically to infrared sensors which operate with high sensitivity at room temperature.

2. Description of the Prior Art

In the area of infrared radiation detection, it has been found that the most sensitive sensors require cryogenic cooling to maintain their sensitivity within a predetermined range. Several patents which illustrate the necessity of cryogenic cooling to maintain detector sensitivity are U.S. Pat. Nos. 3,258,602; 3,435,137; 3,807,188; and 3,006,157. Each of the above cited patents are illustrative of the problem of incorporating cryogenic cooling devices, control systems, and insulating structures with an infrared detector in order to maintain the sensitivity of that detector at a predetermined level.

SUMMARY OF THE INVENTION

The present invention overcomes the cooling problems encountered in the prior art detection systems are providing a detector element which has high sensitivity and operates at room temperature.

The present invention employs the known characteristics of photoconductive material, such as CdS, to obtain indirect measurements of the intensity of incident radiation thereon. Characteristics for CdS are described in a paper entitled "Photoconductive Modulation of Microwave Electric Fields" by W. E. Bulman et al, which appeared in *IRE Transactions on Antennas and Propagations*, March, 1961. That paper shows a plot of RF transmission through a panel of CdS as a function of incident light intensity. The plot illustrates that the absorption coefficient is increased as the number of free electrons (conductivity) is increased due to increased intensity of illumination. The plot also indicates that CdS is highly responsive to very low levels of illumination.

In the present invention, indirect measurements of incident radiation are obtained by mounting a photoconductive film, such as CdS, in the test arm of a microwave bridge. The test arm is joined, by hybrid magic "T"s, with a reference arm containing amplitude and phase control elements. Microwave energy is produced by a generator and is split equally at the first magic T to pass through both arms of the bridge. The microwave energy is then combined in the second magic T. Microwave output from the second magic T is then fed to an RF receiver where it is detected and used as a reference feedback signal to balance the microwave bridge. The test arm of the bridge contains an optical port located so that a pencil beam of incident electromagnetic radiation γ, reflected from a target or transmitted by a remote source, enters the port and illuminates the photoconductive film. The incident radiation causes a change in the conductivity of the photoconductive film, which in turn results in changes to the microwave transmission/reflectance characteristics of the test arm, and thereby unbalances the bridge. The unbalanced condition is detected by the RF receiver; and the signal output of the receiver is used in obtaining a measurement of the intensity of the incident radiation received from the target, or as a feedback signal to rebalance the bridge, if necessary.

In rebalancing the bridge, the output of the RF detector is fed back to a phase shifter and a variable impedance in the reference arm. The phase shifter and the variable impedance are driven until the output of the RF receiver indicates a null. At that point, the bridge is balanced. The intensity of the incident radiation received by the photoconductor can also be determined by monitoring the amount of impedance and phase shift that was added to the reference arm in order to rebalance the bridge.

DESCRIPTION OF THE PREFERRED EMBODIMENT

The FIGURE schematically illustrates a preferred embodiment of the invention, whereby an RF bridge is used to detect low levels of incident electromagnetic radiation from a remote source.

The RF bridge comprises two magic T's 12 and 22, a reference arm 30 and a test arm 40. An RF generator 10 is connected to arm 14 of the magic T 12 and supplies RF energy to the bridge. In this embodiment, the RF energy from the generator 10 is in the X-band. However, it is expected that other wavelengths of RF energy can be used in appropriate waveguide and coaxial cable bridges, with similar results.

As is well known, a magic T has the property of equally dividing power supplied through one arm between the adjacent arms, such as those connected to the reference arm 30 and the test arm 40, if those arms are terminated in matched loads. In this case, arm 16 of the magic T 12 is terminated in an impedance $Z_0$, which corresponds to the termination impedance $Z_0$ of arm 26 in the magic T 22. Since the reference arm 30 and the test arm 40 are dimensionally the same, with the same number of elbows and straight waveguide sections, the power in each arm can be balanced. When the bridge is balanced, equal power is fed into opposing arms of the magic T 22 and is cancelled so that an RF receiver 50, connected to the arm 24 of the magic T 22, detects a null. This null indicates that the amplitude and phase of RF energy fed into the opposing arms of the magic T 22 are identical.

A photoconductive material 44, such as cadium sulfide, is mounted on an insulated substrate so as to be in the RF conductive path of the test arm 40, but insulated from the interior conductive walls of the waveguide. An aperture 46 in the elbow 49 of the test arm 40 allows incident radiation from a remote target or source to enter the test arm 40 and illuminate an area 48 (defocused image) on the photoconductive material 44. Exposure of the photoconductive material 44 to external radiation, within a known wavelength range, causes the material to increase in electrical conductivity and, therefore, effect the reflectance and transmittance characteristics of the test arm 40. An isolator 42 is located in the arm 40, between the RF generator and the photoconductive material 44, to absorb unwanted reflections in the test arm and to provide a more stable load to the generator. In this manner, the photoconductive material is effectively isolated from the generator and the stability of the system is increased.

The reference arm 30 contains a variable impedance 34 and phase shifter 32 that are initially adjusted to produce a null at the RF receiver 50. This initial balancing adjustment may be made when the aperture 46 is oriented to receive background radiation. Subsequently, when incident electromagnetic radiation λ, such as infrared, is received through the aperture 46 from a remote target, the defocused image 48 of the target is spread over the photocoductive material 44 and produces a corresponding change in its conductivity that effects the reflectance and transmittance characteristics of the test arm 40. Therefore, a corresponding imbalance of the bridge is detected by the RF receiver 50.

Of course, the amount of imbalance in the bridge is directly related to the amount of RF energy incident upon the photoconductive material 44. Furthermore, due to the fact that defocused illumination of the incident radiation covers an area 48, which may be a large fraction of the total area of the photoconductive material 44, this sensor has predictable and stable sensitivity. Therefore, repeatability of the derived sensor output signal is enhanced by this "defocus" operation and makes it desirable for use as a calibration standard.

When the sensor of the present invention is desired to be used in a system whereby varying quantities of incident light are to be sequentially sensed and measured, the signal feedback loop from the RF receiver output may be connected by a switch 52. The switch 52 connects the output of the RF receiver 50 to a phase driver circuit 38 which provides a corresponding change to the phase shifter 32 until a phase balance is detected by the RF receiver 50. Simultaneously, the output of the RF receiver 50 is fed to the amplitude driver circuit 36, which provides control of the variable attenuator 34 until the amplitude measured at the arm 24 is nulled. By measuring the change in attenuation and phase shift entered into the reference arm 30, highly sensistive measurements can be made during sequential sensing of incident radiation on the photoconductive material 44.

It will be apparent that many modifications and variations may be effected without departing from the scope of the novel concept of this invention. Therefore, it is intended by the appending claims to cover all such modifications and variations which fall within the spirit of the invention.

I claim:

1. An RF bridge for detecting electromagnetic radiation received from a remote source, comprising:
   means for generating RF energy;
   means defining a test arm for conducting a portion of said RF energy;
   means defining a reference arm for conducting another portion of said RF energy;
   means receiving said RF energy conducted by said test arm means and said reference arm means;
   wherein said test arm means includes a photoconductive material mounted to impede said RF energy conducting therethrough and means for receiving said electromagnetic radiation from said remote source and directing said radiation onto said photoconductive material.

2. An RF bridge as in claim 1, wherein said generating means, test arm means and reference arm means are interconnected by a waveguide T.

3. An RF bridge as in claim 1, wherein said RF energy receiving means, said test arm means and said reference arm means are constructed from matching waveguides and interconnected by a waveguide T.

4. An RF bridge as in claim 1, wherein said test arm means also includes means for isolating said photoconductive material by absorbing undesirable RF reflections in said test arm.

5. An RF bridge as in claim 1, wherein said RF energy receiving means sums said RF energy received from said test arm means and said reference arm means and produces a corresponding output signal indicative of the imbalance therebetween.

6. An RF bridge as in claim 1, wherein said reference arm means includes means responsive to said RF energy receiving means output signal for varying the amplitude of said RF energy conducted through said reference arm and means responsive to said RF receiving means output signal for varying the phase of said RF energy conducted through said reference arm means.

7. An RF bridge as in claim 1, wherein said photoconductive material includes a photoconductive film deposited on a high dielectric substrate mounted within said test arm so as to provide electrical isolation of said photoconductive film from the interior walls of said test arm means.

8. An RF bridge as in claim 1, wherein said radiation receiving means includes an aperture in said test arm waveguide that is transparent to said electromagnetic radiation.

* * * * *